United States Patent
Schubert et al.

(10) Patent No.: US 11,592,523 B2
(45) Date of Patent: Feb. 28, 2023

(54) METHOD AND APPARATUS FOR PROCESSING A RADAR RANGE DOPPLER MATRIX USING A PSEUDORANDOM NOISE DETECTION THRESHOLD

(71) Applicant: Robert Bosch GmbH, Stuttgart (DE)

(72) Inventors: Eugen Schubert, Benningen Am Neckar (DE); Martin Stolz, Leonberg (DE)

(73) Assignee: Robert Bosch GmbH, Stuttgart (DE)

(*) Notice: Subject to any disclaimer, the term of this patent is extended or adjusted under 35 U.S.C. 154(b) by 346 days.

(21) Appl. No.: 17/029,407

(22) Filed: Sep. 23, 2020

(65) Prior Publication Data

US 2021/0116541 A1 Apr. 22, 2021

(30) Foreign Application Priority Data

Oct. 17, 2019 (DE) .......................... 102019216017.4

(51) Int. Cl.
| | | |
|---|---|---|
| *G01S 7/41* | (2006.01) | |
| *G01S 13/58* | (2006.01) | |
| *G01S 13/524* | (2006.01) | |
| *G01S 13/532* | (2006.01) | |

(52) U.S. Cl.
CPC .......... *G01S 7/414* (2013.01); *G01S 13/5246* (2013.01); *G01S 13/532* (2013.01); *G01S 13/584* (2013.01)

(58) Field of Classification Search
CPC ...... G01S 7/415; G01S 7/414; G01S 13/5246; G01S 13/532; G01S 13/584
See application file for complete search history.

(56) References Cited

U.S. PATENT DOCUMENTS

| | | | |
|---|---|---|---|
| 4,845,500 A | * 7/1989 | Cornett | G01S 13/72 342/139 |
| 9,746,549 B1 | * 8/2017 | Parker | G01S 7/292 |
| 2010/0073218 A1 | * 3/2010 | Stockmann | G01S 13/5248 342/146 |
| 2013/0113647 A1 | * 5/2013 | Sentelle | G01S 13/04 342/22 |
| 2019/0317205 A1 | * 10/2019 | Meissner | H03M 7/3059 |

FOREIGN PATENT DOCUMENTS

DE 19637010 A1 5/1997

* cited by examiner

*Primary Examiner* — Donald HB Braswell
(74) *Attorney, Agent, or Firm* — Norton Rose Fulbright US LLP; Gerard Messina

(57) ABSTRACT

Processing of a range-Doppler matrix of a radar system is described. For easy, efficient and rapid ascertainment of a detection threshold of the range-Doppler matrix, only a partial quantity of the cells of the range-Doppler matrix is selected, and the detection threshold is ascertained on the basis of the selected partial quantity of cells of the range-Doppler matrix.

11 Claims, 3 Drawing Sheets

METHOD AND APPARATUS FOR PROCESSING A RADAR RANGE DOPPLER MATRIX USING A PSEUDORANDOM NOISE DETECTION THRESHOLD

CROSS REFERENCE

The present application claims the benefit under 35 U.S.C. § 119 of German Patent No. DE 102019216017.4 filed on Oct. 17, 2019, which is expressly incorporated herein by reference in its entirety.

FIELD

The present invention relates to a method as well as an apparatus for processing a range-Doppler matrix. In addition, the present invention relates to a radar system.

BACKGROUND INFORMATION

To process radar signals, the measuring operation is usually subdivided into a plurality of temporally successive measuring intervals. Moreover, within one measuring interval, the measurement may be subdivided into a plurality of cells. In addition, the individual cells are defined by parameters which characterize the radar signals to be detected there. In the case of a coherent frequency-modulated continuous-wave radar, the individual cells of a range-Doppler matrix may be defined in one dimension by the distance to a potential scattering center, for example, and in the other dimension, by the relative speed of the potential scattering center.

To detect target objects, what are referred to as Constant False Alarm Rate (CFAR) algorithms may be used when processing the radar signals in order to extract target objects, with which the average disturbance power is estimated locally and adaptively.

In so doing, in a detection step, an adaptive threshold must be calculated, based on which cells that have signal components of scattering centers of the objects to be detected are able to be separated from cells having merely a noise component. If the amplitude of a cell lies above such a threshold, the scattering center stemming from an object is detected, and the corresponding distance and speed are noted in the list of the detected objects.

German Patent No. DE 196 37 010 A1 describes a method for processing radar signals, and in particular, determination of the average disturbance power of the radar cells of a matrix of a radar system.

SUMMARY

The present invention provides a method and an apparatus for processing a range-Doppler matrix, as well as a radar system. Advantageous specific example embodiments of the present invention are described herein.

Accordingly, the following is provided:

In accordance with an example embodiment of the present invention, a method is provided for processing a range-Doppler matrix of a radar system, having the steps of selecting a partial quantity of cells of the range-Doppler matrix and ascertaining a detection threshold. In particular, the detection threshold may be ascertained utilizing the values of the selected cells of the range-Doppler matrix. In addition, the method includes a step for detecting a scattering center in the range-Doppler matrix. In so doing, the scattering center may be detected specifically by utilizing the ascertained detection threshold.

Also provided is:

In accordance with an example embodiment of the present invention, an apparatus is provided for processing a range-Doppler matrix of a radar system, having a selection device, a processing device and a detection device. The selection device is designed to select a partial quantity of cells of the range-Doppler matrix. The processing device is designed to ascertain a detection threshold, utilizing the values of the selected cells of the range-Doppler matrix. The detection device is designed to detect a scattering center of the range-Doppler matrix, utilizing the ascertained detection threshold.

Provided finally is:

In accordance with an example embodiment of the present invention, a radar system having a radar sensor, a signal-processing device and an apparatus according to the present invention for processing the range-Doppler matrix, are provided. In this context, the radar sensor is designed to emit and to receive radar signals. The signal-processing device is designed to process the radar signals of the radar sensor and to generate a range-Doppler matrix.

In accordance with the present invention, as a rule, a range-Doppler matrix, as generated in an operational radar system, has a very large number of individual cells. As a result, to detect scattering objects in such a range-Doppler matrix, usually a noise level must be determined which is used to differentiate the values of cells with a scattering center from cells which have merely a noise component. In so doing, because of the large number of cells in a range-Doppler matrix, the complete analysis of the values of all cells requires a very high computational expenditure.

Therefore, in accordance with the present invention, this is taken into account and an efficient, rapid, but nevertheless reliable ascertainment of a detection threshold in order to differentiate cells in a range-Doppler matrix having a scattering center from cells having mere noise components, is provided.

To that end, according to the present invention, it is provided not to utilize all cells of the range-Doppler matrix to ascertain this detection threshold, but rather to determine the detection threshold using only a partial quantity of the cells in a range-Doppler matrix. In this way, the computational expenditure for ascertaining the detection threshold may be reduced. Consequently, the required computing power may be decreased, and in addition, the time for ascertaining the detection threshold may be shortened. Thus, rapid and efficient ascertainment of the detection threshold for a range-Doppler matrix may be attained utilizing relatively inexpensive hardware.

As already mentioned at the outset, the range-Doppler matrix is a matrix having a large number of individual cells. Each cell of this two-dimensional matrix corresponds to a representative signal amplitude for a distance/speed pair within the resolution of the radar sensor. In other words, one dimension of this matrix represents the distance of an object from the radar sensor, and the other dimension represents the relative speed between object and radar sensor. In this context, the ascertainment of such a range-Doppler matrix from the radar sensors is basically conventional, and shall therefore not be explained in detail here.

Because of the numerous system properties of the radar system, each cell of the range-Doppler matrix also has a noise component. To detect objects, that is, scattering centers in the monitoring area of the radar sensor, for each cell of the range-Doppler matrix, it is checked whether the value in a cell lies above a noise level to be ascertained. To do this, however, for an ascertained range-Doppler matrix, it is necessary in each instance to discern a suitable threshold value for the distinction between a pure noise and a signal of a scattering center.

For that purpose, in order to determine the detection threshold for the differentiation between noise and signals of scattering centers, it is proposed not to fully consider all cells of the range-Doppler matrix, but rather to analyze only a small partial quantity of the cells of the range-Doppler matrix, and from this partial quantity, to then determine a suitable detection threshold.

Preferably, to the greatest extent possible, the partial quantity of cells of the range-Doppler matrix which are taken into consideration for ascertaining the detection threshold should include cells from the complete area of the range-Doppler matrix for which a detection threshold is to be ascertained.

As explained in greater detail below, numerous different selection methods may be considered for selecting the cells that are taken into account for ascertaining the detection threshold. For example, the cells may be selected randomly or with the aid of a pseudo-random algorithm. Moreover, cells or groups of cells already determined beforehand may also be selected, which are taken into consideration for ascertaining the detection threshold. If desired, the selection of the cells for ascertaining the detection threshold may also be adapted in view of scattering centers already previously detected.

To detect a scattering center and an object associated with it in the monitoring area of the radar sensor, the individual cells of the range-Doppler matrix may be compared to the ascertained detection threshold. A scattering center may thereby be detected, for example, in those cells in which the value exceeds the ascertained detection threshold. The cells of the range-Doppler matrix thus detected may be transferred accordingly into a list of detected objects. In particular, the distance and speed corresponding to the respective cell as well as possibly the value of the corresponding cell may also be transferred into a list of the detected objects.

According to one specific embodiment of the present invention, the detection of the scattering center includes a comparison of values of the cells in the range-Doppler matrix to the ascertained detection threshold. As already stated previously, a scattering center may be detected when the value in a cell of the range-Doppler matrix exceeds the value of the ascertained detection threshold. On the other hand, if the value in a cell of the range-Doppler matrix lies below the detection threshold, then it is assumed that it is merely a matter of noise components, and therefore the corresponding cell does not represent a scattering center. At the same time, the detection of a scattering center in the range-Doppler matrix is, of course, not limited to the detection of a single cell. Rather, it is possible to decide separately for each individual cell in the range-Doppler matrix, whether or not it represents a scattering center.

According to one specific embodiment of the present invention, to ascertain the detection threshold, first of all a noise threshold may be determined for the range-Doppler matrix. Namely, in so doing, the noise threshold may be determined in due consideration of the values in the selected partial quantity of cells of the range-Doppler matrix. Moreover, to ascertain the detection threshold, a predetermined offset may also be added to the noise threshold. In this way, an additional safety margin in the form of the predetermined offset may also be added to the ascertained noise threshold, in order to further increase the reliability for the detection of scattering centers in the range-Doppler matrix.

According to one specific embodiment of the present invention, the selecting of the partial quantity of cells of the range-Doppler matrix may in each instance include the selecting of several groups of adjacent cells at predetermined positions. For example, first of all a plurality of positions in the range-Doppler matrix may be determined, that is, first of all a plurality of individual cells in the range-Doppler matrix are selected. For each of these positions in the range-Doppler matrix, a group of adjacent cells may then be selected. For instance, for each position, a group of nxm cells, e.g., 5×5 cells, may be selected. In this manner, for each of the chosen positions, an area may be selected whereby, if necessary, it is possible to compensate for outliers of individual cells.

According to one specific embodiment of the present invention, the ascertainment of the detection threshold may include determination of a local noise threshold for each group of cells. Put another way, for each group of several adjacent cells, first of all one common, e.g., average noise threshold is determined. The detection threshold may then be ascertained, utilizing the local noise thresholds determined. In this context, it is understood that the local noise threshold for the group of cells may be determined in any way desired, e.g., by averaging, calculating a median or in any other way.

In particular, the ascertainment of the detection threshold may be calculated with the aid of any suitable statistical method on the basis of the various individual noise thresholds determined beforehand.

According to one specific embodiment of the present invention, the method for processing the range-Doppler matrix may in each instance be applied individually to the rows and/or columns of the range-Doppler matrix. For example, an individual detection threshold may be ascertained for all cells of one row and/or all cells of one column. In addition, a single detection threshold may, of course, also be ascertained for all cells of the range-Doppler matrix.

According to an alternative specific embodiment of the present invention, an identical detection threshold may be used for all cells of the range-Doppler matrix. In this case, a single detection threshold is determinable particularly easily and efficiently for all cells of the range-Doppler matrix, so that the detection threshold may be ascertained very quickly, easily and efficiently on the basis of the partial quantities of cells of the range-Doppler matrix.

According to one specific embodiment of the present invention, the partial quantity of cells of the range-Doppler matrix for ascertaining the detection threshold includes a maximum of 1% of the cells of the range-Doppler matrix. In particular, the selected partial quantity may include a maximum of 5 per thousand, 2 per thousand, 1 per thousand or possibly even fewer cells of the range-Doppler matrix.

The example embodiments and further developments described above may be combined with each other in any way desired, in so far as reasonable. Additional embodiments, further developments and implementations of the present invention also include combinations, not explicitly named, of features of the present invention described above or below in connection with the exemplary embodiments. In addition, one skilled in the art will thus also add individual aspects as improvements to or supplementations of the respective basic forms of the present invention.

BRIEF DESCRIPTION OF THE DRAWINGS

Further features and advantages of the present invention are explained hereinafter with reference to the figures.

DETAILED DESCRIPTION OF EXAMPLE EMBODIMENTS

Figure 1:
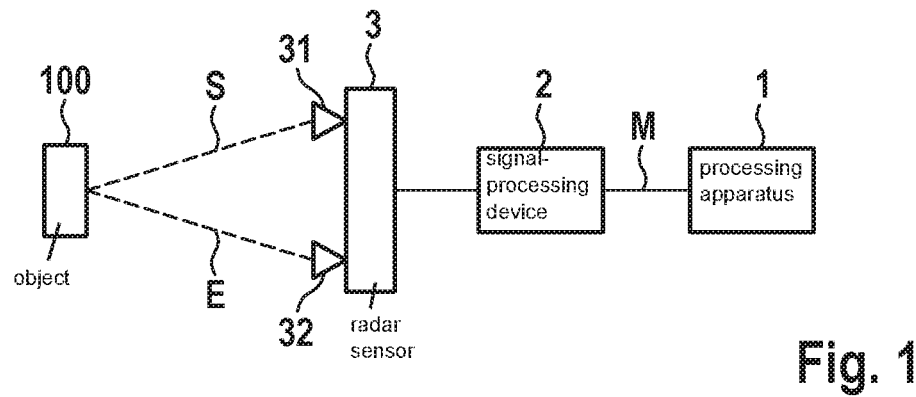
FIG. 1 shows a schematic representation of a block diagram of a radar system having an apparatus for processing a range-Doppler matrix according to one specific embodiment of the present invention.

FIG. 1 shows a schematic representation of a block diagram of a radar system having an apparatus 1 for processing a range-Doppler matrix according to one specific embodiment. For example, the radar system may include a radar sensor 3 which emits radar signals S with the aid of a transmitting antenna 31. Emitted radar signals S may be reflected or scattered partially by an object 100. A portion of the reflected radar signals may be received as receive signal E by a receiving antenna 32 of radar sensor 3. The conditioned receive signals may be processed by a signal-processing device 2 of the radar system. In particular, signal-processing device 2 is able to generate a range-Doppler matrix M. In this context, the function of radar sensor 3 as well as the generating of range-Doppler matrix M may be carried out in any, e.g., conventional manner, and are therefore not explained in greater detail here.

Depending on the resolution, range-Doppler matrix M may have a few hundred thousand, possibly several million or possibly even more cells. In this context, each cell of range-Doppler matrix M corresponds to one specific distance/relative-speed combination.

To evaluate range-Doppler matrix M, range-Doppler matrix M is supplied to a processing apparatus 1. Processing apparatus 1 first of all ascertains a detection threshold. Processing apparatus 1 may then compare the values in the individual cells of range-Doppler matrix M to the ascertained detection threshold. If the value of a cell lies above the detection threshold, then a scattering center may be detected for this cell, that is, an object is able to be detected for the corresponding distance/relative-speed combination.

Because of the very high number of cells of range-Doppler matrix M, calculating the detection threshold utilizing all cells of the range-Doppler matrix is associated with very great expenditure. To simplify the determination of the detection threshold, processing apparatus 1 is thus able to resort to a simplified and efficient ascertainment of the detection threshold, as explained in greater detail below.

Figure 2:
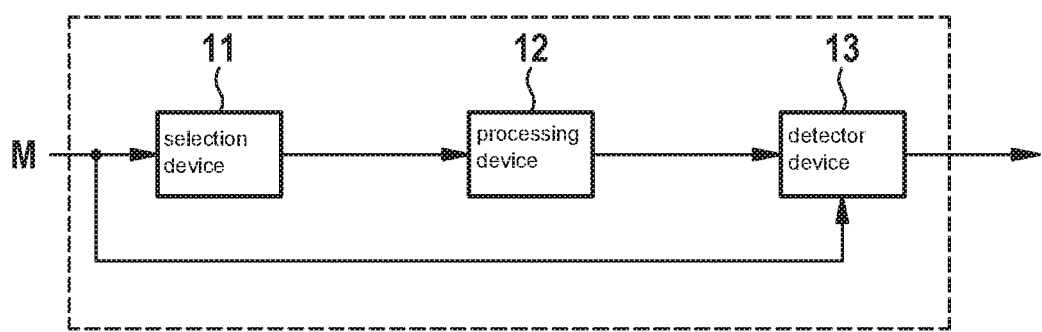
FIG. 2 shows a schematic representation of a block diagram of an apparatus for processing a range-Doppler matrix, in accordance with an example embodiment of the present invention.

FIG. 2 shows a schematic representation of a block diagram of an apparatus 1 for processing a range-Doppler matrix M. A range-Doppler matrix M is provided at the input of apparatus 1. For example, such a range-Doppler matrix M may be generated by the radar system previously described. First of all, a partial quantity of the cells of range-Doppler matrix M is selected in a selection device 11. To that end, for example, a predetermined number of cells of range-Doppler matrix M may be selected randomly. For instance, a maximum of 1% or even less, e.g., 5 per thousand, 2 per thousand, 1 per thousand or possibly even fewer of the cells of range-Doppler matrix M may be selected.

In addition to a purely random selection or a selection with the aid of a pseudo-random algorithm, it is also possible to use a predetermined schema for selecting the partial quantity of cells of range-Doppler matrix M. Regardless of whether the partial quantity of cells is selected randomly or according to a predetermined schema, for selecting the partial quantity of cells of range-Doppler matrix M, the cells of the partial quantity should be distributed as uniformly as possible over the entire area of range-Doppler matrix M to be evaluated.

Besides a predefined schema for selecting the cells of range-Doppler matrix M, it is also possible to determine an individual partial quantity for each range-Doppler matrix M. In addition, it is also possible to adjust the selection of the cells depending on previous detection results. For example, in selecting the cells, specifically those cells may be avoided in which a scattering center was detected in a previous detection. Alternatively, in selecting the partial quantity, it is also possible to select a predetermined number of cells for which a scattering center was detected in a previous detection.

In addition to the choice of individual cells for the selection of a partial quantity of cells of range-Doppler matrix M, it is also possible in each instance to combine a group of cells, especially adjacent cells, at different positions. For instance, several positions within range-Doppler matrix M may be selected randomly or on the basis of a predetermined schema, and a group of adjacent cells may then be combined at each of the selected positions. For example, m×n cells, e.g., 5×5 cells may be combined in each instance to form a group. The values of the cells of such a group may thereupon either all be considered individually, or the values of a group may first of all be combined, and a combined value may then be further processed for each group.

After a partial quantity of cells of range-Doppler matrix M has been combined, a detection threshold for range-Doppler matrix M may be ascertained in a processing device 12, for example. In particular, this detection threshold may be ascertained utilizing the values of the partial quantity of cells of range-Doppler matrix M selected previously in selection device 11. To that end, for example, the individual values of the cells of the partial quantity of cells of range-Doppler matrix M may be analyzed in order to determine a noise threshold from these values. In so doing, this noise threshold may be determined in any suitable manner desired. For instance, a statistical analysis may be carried out in order to identify a threshold which identifies the boundary between noise values and significant values that, e.g., represent a scattering center. As to that, it may be assumed, for example, that in a large portion of the cells of the range-Doppler matrix, and thus also in a large portion of the selected cells of the partial quantity, only noise values can be found. If values of a scattering center are found at all in one or more of the cells of the partial quantities of the cells of range-Doppler matrix M, then it may be assumed that these cells make up only a relatively small share of the selected cells.

Moreover, in order to additionally increase the reliability of the detection of scattering centers, if desired, a safety margin in the form of a predetermined offset or something similar may also be added to the detected noise threshold previously described. The detection threshold is thus obtained from the sum of the detected noise threshold and the safety margin in the form of a predetermined offset.

Range-Doppler matrix M may subsequently be evaluated utilizing the ascertained detection threshold, in order to determine one or more scattering centers in the range-Doppler matrix. To that end, a detector device 13 may compare the values in the individual cells of range-Doppler matrix M to the ascertained detection threshold. If the value in a cell of range-Doppler matrix M lies above the ascertained detection threshold, it may then be assumed that this cell represents a scattering center.

Accordingly, such a cell may be entered into a list of hits, that is, a list of detected objects. Moreover, a distance and a relative speed which are represented by such a cell may be entered into the hit list, for example. If desired, the concrete value of this cell may also be entered into the hit list.

In this context, to evaluate range-Doppler matrix M, as described previously, one common detection threshold ascertained beforehand may be used for all cells of range-Doppler matrix M. In addition, it is also possible in principle, however, to in each case ascertain an individual detection threshold for individual rows or columns. Accordingly, the partial quantity of cells of range-Doppler matrix M for ascertaining the detection threshold also pertains correspondingly only to cells of such a row or column. In this way, in each instance an individual detection threshold may be used for the individual distances and relative speeds, respectively.

Figure 3:
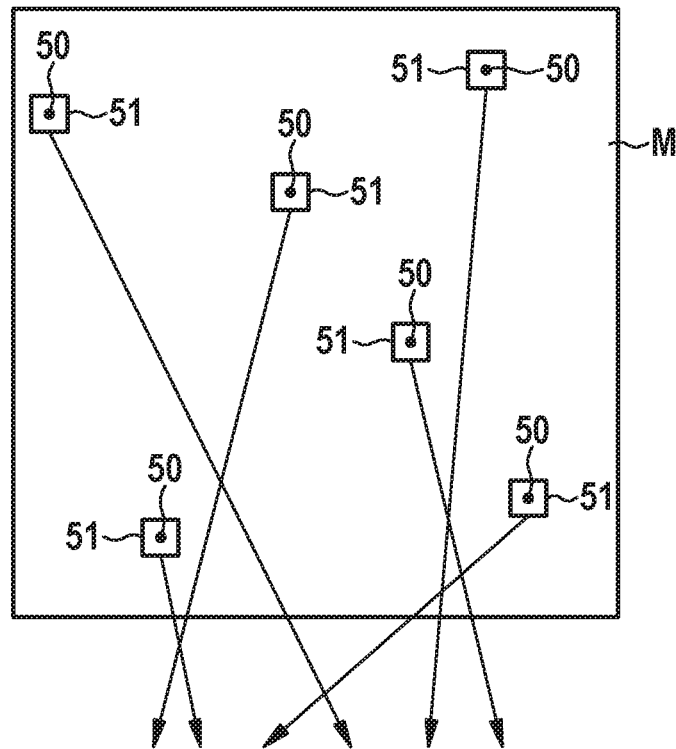
FIG. 3 shows a schematic representation for ascertaining a detection threshold in accordance with an example embodiment of the present invention.
Figure 3:
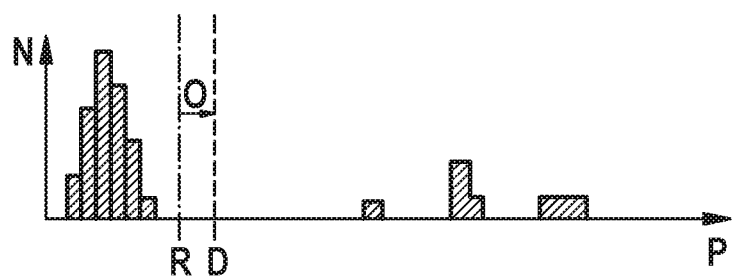

FIG. 3 shows a schematic representation for ascertaining a detection threshold for a range-Doppler matrix M according to one specific embodiment. To that end, in the upper section of FIG. 3, a range-Doppler matrix M is represented schematically. First of all, a partial quantity of cells may be selected from this range-Doppler matrix M. As already described previously, in so doing, in each case single cells may be selected individually. Alternatively, it is also possible to first of all select a plurality of positions 50 in range-Doppler matrix M. A group 51 of adjacent cells may then be selected for each of positions 50. In this case, in each instance one common noise threshold may first be determined for group 51 of cells. For example, an average value, a median or any other suitable value may be formed for this purpose. During the further course, each of the values of the noise thresholds of groups 51 may thereupon be evaluated in order to determine one noise threshold. On the other hand, if the single cells of the partial quantity are considered individually, then the values of the cells may also be utilized directly for determining the noise threshold.

As shown in the lower section of FIG. 3, a histogram or something similar may be formed, for instance, in which frequency N of individual values P of the values in the cells of range-Doppler matrix M or of the previously determined noise thresholds for groups 51 are combined.

It may be assumed here that values which have a high frequency correspond to cells without a scattering center. In other words, it may be assumed that in the vast majority of cells of the range-Doppler matrix and therefore also in the vast majority of cells of the selected partial quantity of range-Doppler matrix M, there is no scattering center, and thus these cells have only a noise value.

Accordingly, noise threshold R for range-Doppler matrix M may be set to a value which is slightly above a frequency of level values. This is represented by a dot-dash line in the lower section of FIG. 3. As already described before, for a further delimitation, a safety margin in the form of an offset O may also be added to this noise threshold. Accordingly, detection threshold D is obtained by the dashed line shown in FIG. 3.

Figure 4:
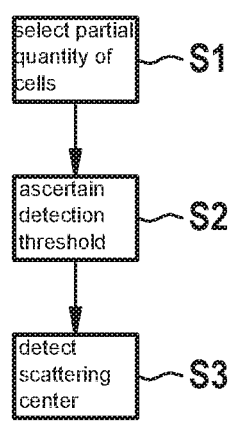
FIG. 4 shows a flowchart as underlies a method for processing a range-Doppler matrix according to one specific embodiment of the present invention.

FIG. 4 shows a schematic representation of a flowchart, as underlies a method for processing a range-Doppler matrix M according to one specific embodiment. In general, the method may execute any given steps, as have already been described previously in connection with apparatus 1 for processing range-Doppler matrix M. Correspondingly, the above-described apparatus 1 may also have components as needed in order to carry out the following steps as described above.

In step S1, first of all, a partial quantity of cells of range-Doppler matrix M is selected. In step S2, a detection threshold D may then be ascertained. Specifically, detection threshold D is ascertained utilizing the values of the selected cells of range-Doppler matrix M. In step S3, a scattering center may thereupon be detected in range-Doppler matrix M, the scattering center being detected utilizing ascertained detection threshold D. Namely, a scattering center may be detected in those cells of range-Doppler matrix M which have a value that lies above ascertained detection threshold D.

In summary, the present invention relates to the processing of a range-Doppler matrix of a radar system. For easy, efficient and rapid ascertainment of a detection threshold of the range-Doppler matrix, only a partial quantity of the cells of the range-Doppler matrix is selected, and the detection threshold is ascertained on the basis of the selected partial quantity of cells of the range-Doppler matrix.

What is claimed is:

1. A method for processing a range-Doppler matrix for use with a radar system, the method comprising:
    selecting, via a selection device, a partial quantity of cells of the range-Doppler matrix;
    ascertaining, via a processing device, a detection threshold utilizing values of the cells of the range-Doppler matrix; and
    detecting, via a detection device, a scattering center in the range-Doppler matrix utilizing the ascertained detection threshold;
    wherein the method for processing the range-Doppler matrix is performed with an apparatus, and
    wherein the radar system includes:
        a signal-processing device;
        a radar sensor that emits and receives radar signals, wherein the radar sensor inputs received radar signals to the signal processing device, which generates a range-Doppler matrix based on the received radar signals; and
        the apparatus to process the range-Doppler matrix,
        wherein the partial quantity of cells of the range-Doppler matrix is selected randomly with a pseudo-random algorithm,
        wherein in ascertaining the detection threshold, individual values of the cells of the partial quantity of cells of the range-Doppler matrix are analyzed to determine a noise threshold from the values.

2. The method as recited in claim 1, wherein the detecting of the scattering center includes comparing values of the cells of the range-Doppler matrix to the ascertained detection threshold.

3. The method as recited in claim 1, wherein for ascertaining the detection threshold, a noise threshold is determined utilizing the values of the selected cells of the range-Doppler matrix, and the detection threshold is calculated from a sum of the noise threshold and an offset.

4. The method as recited in claim 1, wherein the selecting of the partial quantity, in each instance, includes selecting a group of a plurality of adjacent cells at predetermined positions.

5. The method as recited in claim 4, wherein the ascertaining of the detection threshold includes determining a local noise threshold for each group of cells, and the detection threshold is ascertained utilizing the local noise thresholds determined.

6. The method as recited in claim 1, wherein the method is applied individually to rows and/or columns of the range-Doppler matrix.

7. The method as recited in claim 1, wherein an identical detection threshold is used for all cells of the range-Doppler matrix.

8. The method as recited in claim 1, wherein the selected partial quantity includes a maximum of 1 percent of the cells of the range-Doppler matrix.

9. The method as recited in claim 1, wherein:
   a statistical analysis is performed to identify a threshold which identifies a boundary between noise values and significant values that represent a scattering center,
   each cell of the range-Doppler matrix corresponds to one specific distance/relative-speed combination, and
   the processing device compares values in the cells of the range-Doppler matrix to the ascertained detection threshold, and wherein when a value of a cell lies above the detection threshold, then a scattering center is detected for the cell, so that an object is detected for a corresponding distance/relative-speed combination.

10. An apparatus to process a range-Doppler matrix for use with a radar system, comprising:
    a selection device to select a partial quantity of cells of the range-Doppler matrix;
    a processing device to ascertain a detection threshold utilizing the values of the selected cells of the range-Doppler matrix; and
    a detection device to detect a scattering center in the range-Doppler matrix utilizing the ascertained detection threshold;
    wherein the radar system includes:
      a signal-processing device;
      a radar sensor that emits and receives radar signals, wherein the radar sensor inputs received radar signals to the signal processing device, which generates a range-Doppler matrix based on the received radar signals; and
    wherein the partial quantity of cells of the range-Doppler matrix is selected randomly, with a pseudo-random algorithm,
    wherein in ascertaining the detection threshold, individual values of the cells of the partial quantity of cells of the range-Doppler matrix are analyzed to determine a noise threshold from the values.

11. A radar system, comprising:
    a signal-processing device;
    a radar sensor that emits and receives radar signals, wherein the radar sensor inputs received radar signals to the signal processing device, which generates a range-Doppler matrix based on the received radar signals; and
    an apparatus to process the range-Doppler matrix, the apparatus including:
      a selection device to select a partial quantity of cells of the range-Doppler matrix,
      a processing device to ascertain a detection threshold utilizing the values of the selected cells of the range-Doppler matrix, and
      a detection device to detect a scattering center in the range-Doppler matrix utilizing the ascertained detection threshold;
    wherein the partial quantity of cells of the range-Doppler matrix is selected randomly, with a pseudo-random algorithm,
    wherein in ascertaining the detection threshold, individual values of the cells of the partial quantity of cells of the range-Doppler matrix are analyzed to determine a noise threshold from the values.

* * * * *